United States Patent
Rajaa (10) Patent No.: US 9,948,509 B1
(45) Date of Patent: *Apr. 17, 2018

(54) METHOD AND APPARATUS FOR OPTIMIZING RESOURCE UTILIZATION WITHIN A CLUSTER AND FACILITATING HIGH AVAILABILITY FOR AN APPLICATION

(71) Applicant: Veritas Technologies LLC, Mountain View, CA (US)

(72) Inventor: Subash Rajaa, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 14/588,623

(22) Filed: Jan. 2, 2015

Related U.S. Application Data (63) Continuation of application No. 12/411,864, filed on Mar. 26, 2009, now Pat. No. 8,930,539.

(51) Int. Cl.
*G06F 15/177* (2006.01)
*H04L 12/24* (2006.01)

(52) U.S. Cl.
CPC ................. *H04L 41/0816* (2013.01)

(58) Field of Classification Search
CPC .................................................. H04L 41/0816
See application file for complete search history.

(56) References Cited

U.S. PATENT DOCUMENTS

| | | | |
|---|---|---|---|
| 7,484,208 B1 * | 1/2009 | Nelson | G06F 9/45558 711/6 |
| 2006/0155912 A1 * | 7/2006 | Singh | G06F 9/5088 711/6 |
| 2009/0307456 A1 * | 12/2009 | Patwari | G06F 9/5016 711/173 |
| 2010/0037089 A1 * | 2/2010 | Krishnan | G06F 11/1484 714/5.11 |

OTHER PUBLICATIONS

Erin M. Farr et al, 2008, A Case for High Availability in a Virtualized Environment (HAVEN), IEEE, p. 675-682.*
VMware ESX Server Version 1.5, VMWare Inc, 2002, p. 1-2, 13-14, 110, 234-237.*

* cited by examiner

*Primary Examiner* — Ryan Jakovac
(74) *Attorney, Agent, or Firm* — Campbell Stephenson LLP (57) ABSTRACT

A method and apparatus for optimizing resource utilization within a cluster and facilitating high availability for an application is described. In one embodiment, the method for optimizing resource utilization within a cluster and facilitating high availability for an application includes accessing configuration information regarding virtual machine nodes within the cluster to identify an active node and at least one passive node that are associated with the application and configuring the at least one passive node to be in a suspended state, wherein a passive node of the at least one passive node is to be in a running state and the active node is to be in a suspended state upon migration of the application to the passive node of the at least one passive node.

20 Claims, 4 Drawing Sheets

METHOD AND APPARATUS FOR OPTIMIZING RESOURCE UTILIZATION WITHIN A CLUSTER AND FACILITATING HIGH AVAILABILITY FOR AN APPLICATION

CROSS-REFERENCE TO RELATED APPLICATIONS

The present patent application is a continuation of and is related to U.S. patent application Ser. No. 12/411,864, filed on Mar. 26, 2009, entitled "Method and Apparatus for Optimizing Resource Utilization Within a Cluster and Facilitating High Availability for an Application", which will issue as U.S. Pat. No. 8,930,539, on Jan. 6, 2015.

BACKGROUND

Field of the Invention

Embodiments of the present invention generally relate to cluster resource management and, more particularly, to a method and apparatus for optimizing resource utilization within a cluster and facilitating high availability for an application.

Description of the Related Art

In a typical computing environment, small to large enterprises utilize various virtualization techniques to host mission critical applications. For example, one or more virtual machines may be installed on one or more physical machines (e.g., a computer, a server and/or the like). Further, the virtual machines are abstract representations of the physical machines and executes like a real physical machine. As such, the mission critical applications (hereinafter, the applications) are required to run continuously, and uninterruptedly. In other words, the applications need to be highly available.

In particular, the one or more virtual machines are linked to each other to form a cluster to provide application services to one or more client computers. As such, certain failures may occur within hardware devices or software components within the cluster. For example, a hard disk of a particular physical machine, which hosts a particular virtual machine, may crash. As a result, the application running on the virtual machine may not operate properly. In such instances, the application is failed over to another virtual machine in order to facilitate high availability of the application.

Currently, clustering software may be employed to manage the virtual machines and failover the applications from one virtual machine to another virtual machine within the cluster. Such clustering software needs to continuously track a state of each virtual machine within the cluster to determine whether a certain virtual machine is alive or dead. In particular, the clustering software sends Transmission Control Protocol/Internet Protocol (TCP/IP) heartbeats from a virtual machine to each of the nodes indicating either that the virtual machine is operational or non-operational. In such instance, the application may be failed over from one virtual machine to another virtual machine in case of any failure. However, if the virtual machine is powered off, no heartbeat is communicated and the virtual machine is considered to be dead. Hence, the application cannot be migrated to the powered off virtual machine. As a result, the clustering software requires each and every virtual machine within the cluster to be in a running state. Such a requirement wastes valuable computer resources.

Therefore, there is a need in the art, for a method and apparatus for optimizing resource utilization within a cluster and facilitating high availability for an application.

SUMMARY OF THE INVENTION

Embodiments of the present invention generally comprise a method and apparatus for optimizing resource utilization within a cluster and facilitating high availability for an application. In one embodiment, a method for optimizing resource utilization within a cluster and facilitating high availability for an application includes accessing configuration information regarding virtual machine nodes within the cluster to identify an active node and at least one passive node that are associated with the application and configuring the at least one passive node to be in a suspended state, wherein a passive node of the at least one passive node is to be in a running state and the active node is to be in a suspended state upon migration of the application to the passive node of the at least one passive node.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
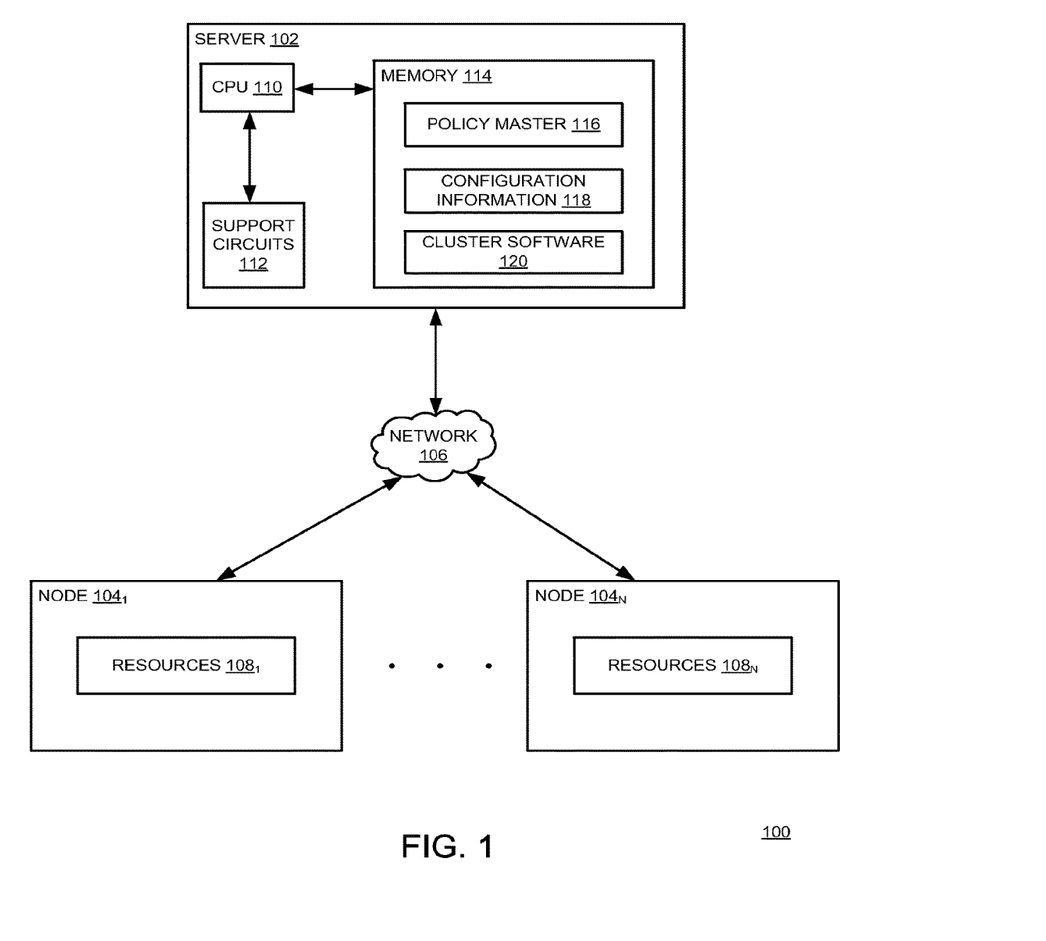
FIG. 1 is a block diagram of a system for optimizing resource utilization within a cluster and facilitating high availability for an application in accordance with one or more embodiments of the invention.

FIG. 1 is a block diagram of a system 100 for optimizing resource utilization within a cluster and facilitating high availability for an application according to one or more embodiments of the invention. The system 100 includes a server 102 and a plurality of nodes 104 (e.g., virtual machine nodes), where each is coupled to each other through a network 106.

The server 102 is a type of computing device (e.g., a laptop, a desktop, a Personal Digital Assistant (PDA), a tablet PC, a mobile phone and/or the like), such as those generally known in the art. The server 102 includes a Central Processing Unit (CPU) 110, various support circuits 112 and a memory 114. The CPU 110 may comprise one or more commercially available microprocessors or microcontrollers that facilitate data processing and storage. The various support circuits 112 facilitate operation of the CPU 110 and may include one or more clock circuits, power supplies, cache, input/output circuits and the like. The memory 114 comprises at least one of Read Only Memory (ROM), Random Access Memory (RAM), disk drive storage, optical storage, removable storage and the like. The memory 114 includes various software packages, such as a policy master 116 and cluster software 120. The memory 114 further includes various data, such as configuration information 118.

Generally, the network 106 comprises a communication system that connects computers by wire, cable, fiber optic and/or wireless link facilitated by various types of well-known network elements, such as hubs, switches, routers and the like. The network 106 may employ various well-known protocols to communicate information amongst the network resources. For example, the network 106 may be a part of the Internet or Intranet using various communications infrastructure, such as Ethernet, Wi-Fi, WiMAX, General Packet Radio Service (GPRS) and/or the like. Furthermore, the network 106 may form a portion of a Storage Network Area (SAN) using various communications infrastructure such as Ethernet, Internet Small Computer System Interface (iSCSI), Fibre Channel, Infiniband and/or the like.

Generally, the plurality of nodes 104 are computing devices (e.g., virtual machines) that include various resources 108 (illustrated as resources $108_1$ ... resources $108_N$ corresponding to the node $104_1$ ... the node $104_N$ respectively). Furthermore, the resources 108 may include application resources, replication resources, database resources, network resources, storage resources and/or the like. In one embodiment, service groups may be configured to utilize various portions of the resources 108 to provide an application to one or more end users (e.g., a client computer). For example, the application may be a database that depends on various computer resources, such as network resources (e.g., Virtual IP addresses, Network Interface Cards (NICs) and/or the like), storage resources (e.g., physical disks, magnetic tape drives and/or the like), software resources (e.g., operating system processes, application processes and/or the like), file system resources (e.g., mounted volumes, network shared partitions and/or the like) and/or the like.

According to various embodiments, the plurality of nodes 104 may include one or more virtual machine nodes that form a cluster. As such, the one or more virtual machine nodes may be one or more virtual machines that are running on one or more physical machines (e.g., a physical computer). As described further below, an application that is required to be highly available is installed on each virtual machine of the one or more virtual machines. Furthermore, a service group for operating the application is configured on the each virtual machine of the one or more virtual machines.

According to various embodiments, the plurality of nodes 104 may operate in an active-passive configuration. In other words, a particular node of the plurality of nodes 104 functions as an active node at a particular time while one or more remaining nodes of the plurality of nodes 104 are configured to be passive nodes. For example, the active node may be a virtual machine in a running state (i.e., the application is online). Furthermore, the passive nodes (i.e., standby nodes) may be virtual machines in a suspended state. Accordingly, an operating system of each passive node is fully booted but the application (e.g., service group) is offline.

According to one or more embodiments, the policy master 116 includes software code that is configured to monitor the plurality of nodes 104 in order to optimize utilization of the resources 108 and provide high availability to an application. In one embodiment, the policy master 116 continuously monitors states of one or more passive nodes to maintain each and every passive node in a suspended state. The policy master 116 examines the configuration information 118 as explained further below. Furthermore, the policy master 116 is configured to identify a failure of the resources 108 on any node of the plurality of nodes 104. During a subsequent failover operation, the policy master 116 instructs the cluster software 120 to migrate the application from the active node to the passive node as explained further below.

The configuration information 118 indicates a state for each node (e.g., virtual machine node) of the plurality of nodes 104 within the cluster. In one embodiment, the configuration information 118 indicates an active node and one or more passive nodes for an application. As such, the configuration information 118 may be used to identify an active node for operating the application as well as one or more passive nodes amongst the plurality of nodes 104. In another embodiment, the configuration information 118 is utilized by the policy master 116 to select a passive node from the one or more passive nodes to which the application is to be migrated (e.g., failed over) from the active node in an event of any failure (e.g., a software fault).

In one embodiment, the policy master 116 communicates queries related to the plurality of nodes 104 to determine and maintain a state of a particular node (e.g., virtual machine node). For example, the policy master 116 may be coupled with a server that manages a plurality of computers that host the plurality of nodes 104 (e.g., virtual machines). Accordingly, the policy master 116 uses an Application Programming Interface (API) associated with the server to determine a state of a particular node of the plurality of nodes 104. Alternatively, the policy master 116 is directly coupled with the plurality of host computers and utilizes a host virtual machine management API to determine a state of a particular node of the plurality of nodes 104. In addition, the policy master 116 updates the configuration information 118 in response to any modification to a state associated with the particular node of the plurality of nodes 104. By maintaining the particular node in the suspended state, the policy master 116 considers the particular node to be alive and therefore, available as a failover target for the application.

In one or more embodiments, the policy master 116 and the cluster software 120 cooperate to optimize resource utilization and provide high availability to an application (e.g., Word processors, spreadsheets, media players, database applications and/or the like). Generally, the cluster software 120 operates in accordance with instructions from the policy master 116. For example, if the policy master 116 identifies an occurrence of a hardware failure or software fault at a certain active node, the policy master 116 instructs the cluster software 120 to migrate the application from the certain active node to a passive node. During the migration, the policy master 116 configures the active node to be in a suspended state and the passive node to be in a running state. For example, the cluster software 120 stops the application (e.g., set to offline) and suspends the active node. Then, the cluster software 120 resumes the passive node and initiates the application (e.g., brings online). Alternatively, the cluster software 120 resumes the active node from the suspended state and initiates the application on the active node instead of the passive node, if there is no passive node configured.

Figure 2:
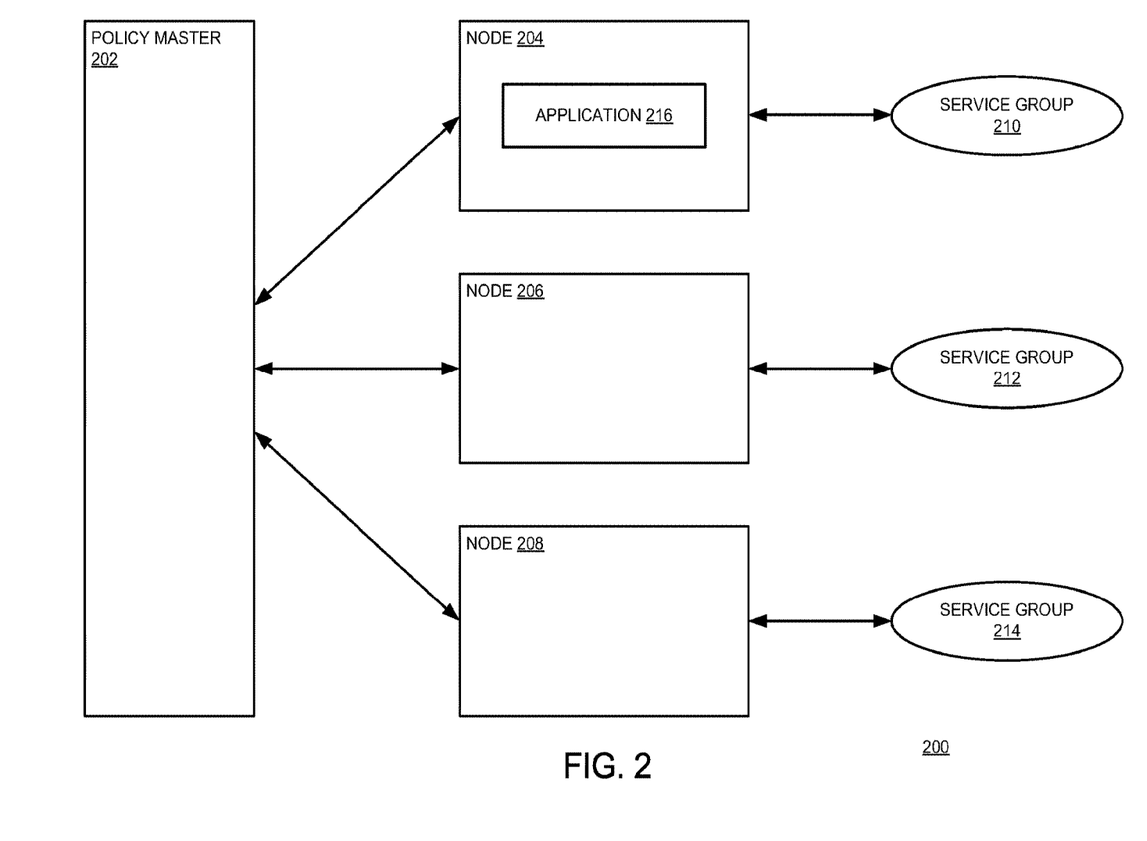
FIG. 2 is a functional block diagram that illustrates an active-passive node configuration within a cluster in accordance with one or more embodiments of the invention.

FIG. 2 is a functional block diagram that illustrates an active-passive node configuration within a cluster according to one or more embodiments of the invention. A policy master 202 is coupled with a node 204, a node 206 and a node 208. Further, the node 204 operates an application 216 in order to provide various services to a client computer. In addition, service group 210, a service group 212 and a service group 214 are configured on the node 204, the node 206 and the node 208, respectively.

Generally, a service group (e.g., a VERITAS CLUSTER SERVER (VCS) ONE service group) includes one or more hardware and/or software resources at one or more nodes (e.g., the node 204), required to run applications (e.g., the application 216) on the respective node. In one embodiment, the service group enables control over one or more of the hardware resources (e.g., a network resource, such as a Network Interface Card (NIC)) and software resources (e.g., a process, such as a web application process) associated with operating application (e.g., the application 216) as a single unit. On occurrence of a fault, the hardware and software resources do not fail over individually, but the entire service group is failed over.

As an example, the application 216 may be currently online on the node 204 and offline at the node 206 and the node 208. Generally, the policy master 202 continuously monitors the node 204, the node 206 and the node 208. In one embodiment, the policy master 202 sends a query to each of the physical machines that host each of the virtual machines. In one embodiment, the policy master 202 is connected directly to each of the physical machines and utilizes the virtual machine management Application Programming Interface (API) (e.g., VMware Host Software Development Kit (SDK), Hyper-V Virtualization WMI provider and/or the like) to determine a state of each of the virtual machines installed on a physical machine. In another embodiment, the policy master 202 communicates with a server that manages each of the physical machines and utilizes an API provided by such a server to determine a state of each of the virtual machines.

In one or more embodiments, if the policy master 202 identifies that the application 216 on the node 204 is not operating properly, the policy master 202 selects the node 206 as a failover target. For example, a software fault may occur within the node 204, which disrupts the service group 210. As a result, the application 216 is inoperable. Accordingly, the application 216 is migrated to the node 206.

Figure 3:
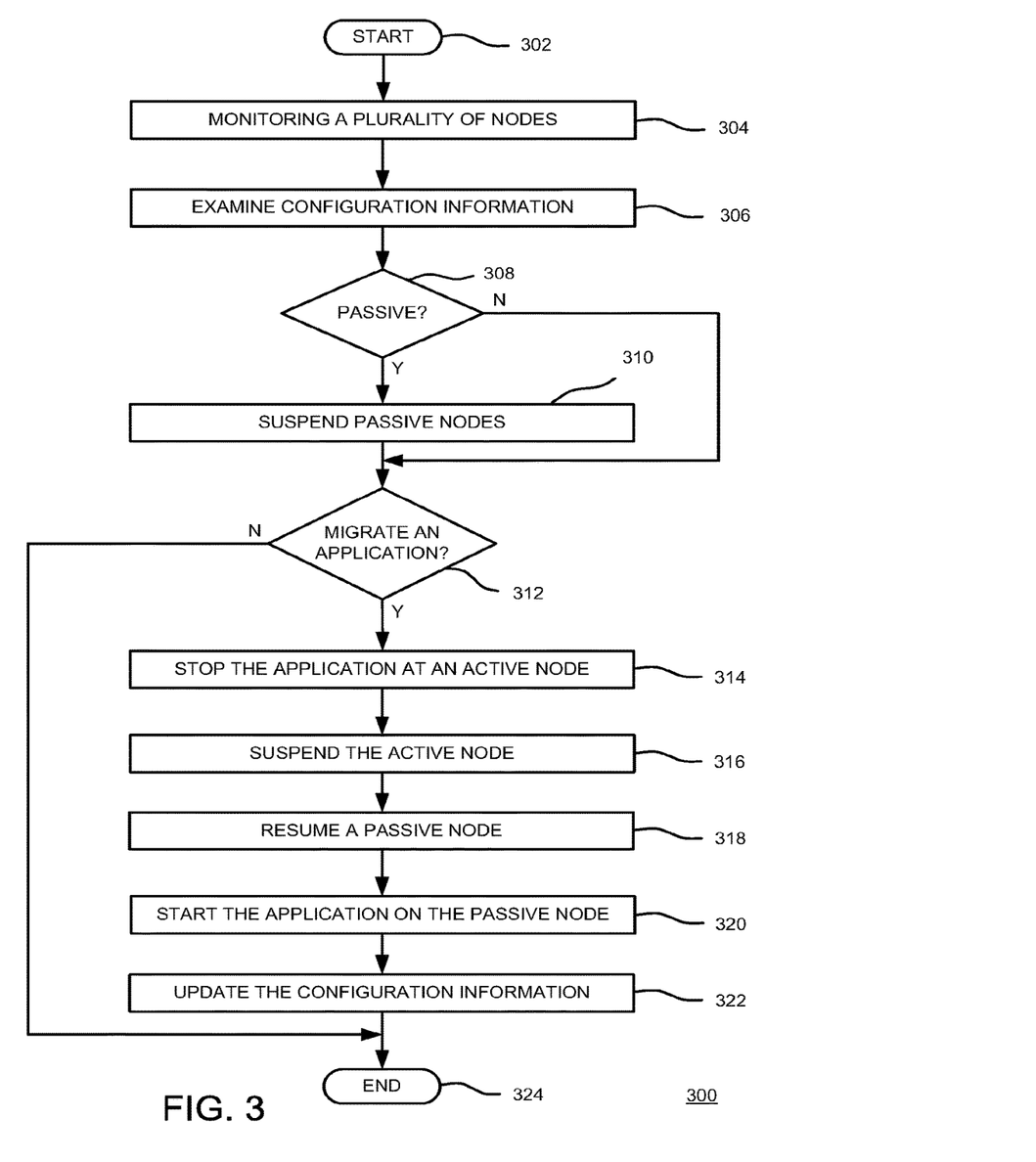
FIG. 3 is a flow diagram of a method for monitoring a plurality of nodes to optimize resource utilization and provide high availability to an application in accordance with one or more embodiments of the invention.

FIG. 3 is a flow diagram of a method 300 for monitoring a plurality of nodes to optimize resource utilization and provide high availability to an application according to one or more embodiments of the invention. The method 300 starts at step 302 and proceeds to step 304, at which a plurality of nodes (e.g., the plurality of nodes 104 of FIG. 1) are monitored. In one embodiment, a policy master (e.g., the policy master 116 of FIG. 1 or the policy master 202 of FIG. 2) monitors the plurality of the nodes.

At step 306, configuration information (e.g., the configuration information 118 of FIG. 1) is examined. At step 308, a determination is made as to whether there are any passive nodes for the application. In one embodiment, the policy master examines the configuration information to identify an active node for operating the application as well as one or more passive nodes. If at step 308, it is determined that there are no passive nodes (option "NO"), then the method 300 proceeds to step 312. If at step 308, it is determined that there are one or more passive nodes (option "YES"), then the method 300 proceeds to step 310. At step 310, the one or more passive nodes are suspended. For example, the policy master instructs cluster software (e.g., the cluster software 120 of FIG. 1) to suspend the one or more passive nodes. Accordingly, the cluster software suspends the passive nodes.

At step 312, a determination is made as to whether an application (e.g., the application 216 of FIG. 2) is to be migrated. If at step 312, it is determined that the application is not to be migrated (option "NO"), then the method 300 proceeds to step 324. If at step 312, it is determined that the application is to be migrated (option "YES"), then the method 300 proceeds to step 314. At step 314, the application at an active node is stopped. In one embodiment, the policy master instructs the cluster software to offline the application at the active node. At step 316, the active node is suspended. In one embodiment, the policy master instructs the cluster software to suspend the active node only after halting the application.

At step 318, a passive node is resumed. For example, the cluster software resumes the passive node on which the application is to be failed over, as determined by the policy master. After step 318, the method 300 proceeds to step 320, at which the application on the passive node is started. At step 322, the configuration information is updated. For example, the policy master updates the configuration information to include a current status of nodes. For example, the active node is now passive and in a suspended state. Furthermore, the resumed passive node is now active and in a running state. At step 324, the method 300 ends.

Figure 4:
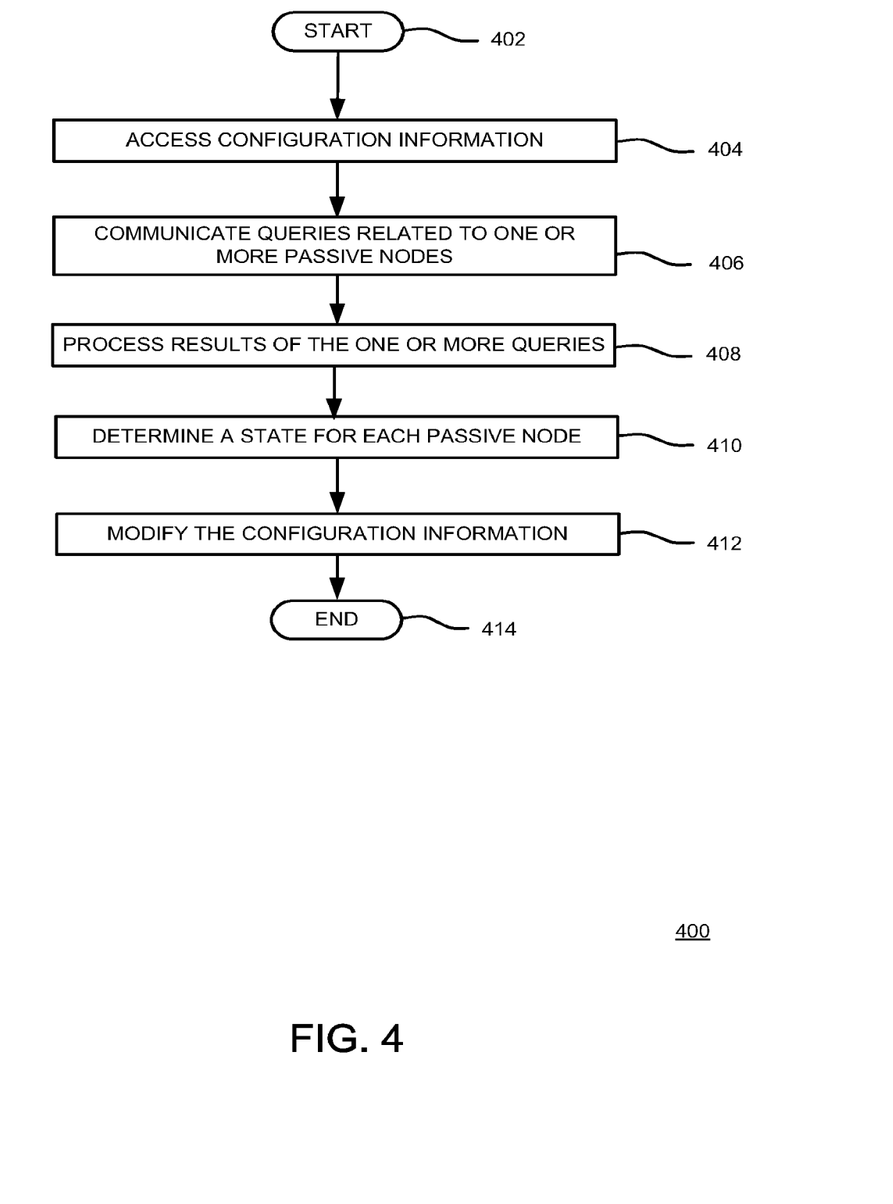
FIG. 4 is a flow diagram of a method for continuously monitoring states of one or more passive nodes within a cluster in accordance with one or more embodiments of the invention.

FIG. 4 is a flow diagram of a method 400 for continuously monitoring states of one or more passive nodes within a cluster according to one or more embodiments of the invention. As a result, the one or more passive nodes are maintained in a suspended state. Hence, the one or more passive nodes may be used a target to which an application is migrated from an active node. The method 400 starts at step 402 and proceeds to step 404, at which configuration information (e.g., the configuration information 118 of FIG. 1) regarding a plurality of nodes (e.g., the plurality of nodes 104 of FIG. 1) is accessed.

At step 406, one or more queries related to the one or more passive nodes of the plurality of nodes are communicated. In one embodiment, a policy master (e.g., the policy master 116 of FIG. 1) communicates the one or more queries related to the one or more passive nodes. The queries may be sent to a physical computer (i.e., physical server) that is hosting one or more virtual machine nodes. Alternatively, the queries may be sent to a management server for one or more physical computers that host the one or more virtual machine nodes. At step 408, results of the one or more queries are processed. At step 410, a state for each passive node is determined. At step 412, the configuration information is modified. At step 414, the method 400 ends.

While the foregoing is directed to embodiments of the present invention, other and further embodiments of the invention may be devised without departing from the basic scope thereof, and the scope thereof is determined by the claims that follow.

What is claimed is:

1. A method comprising:
   accessing configuration information, wherein
      the configuration information indicates
         a state of each node of a plurality of nodes of a cluster, and
         that an active node and a passive node are associated with an application;
   identifying, using the configuration information, the passive node of a plurality of passive nodes, wherein the plurality of nodes comprises the plurality of passive nodes,
each of the plurality of passive nodes is in a suspended state;
the passive node is in a suspended state at least by virtue of
an operating system being loaded on the passive node, and
the application being configured in an offline state on the passive node, and
the identifying comprises
determining a state of the passive node by
communicating a query, related to the passive node, to a physical computer hosting the passive node, and
receiving a response to the query, wherein
the response comprises information indicating the state of the passive node;
suspending the active node, wherein
the suspending the active node comprises
stopping the application at the active node by configuring the application to be in an offline state at the active node, and
configuring the active node to be in the suspended state;
migrating the application to the passive node, wherein
the migrating the application to the passive node comprises
configuring the passive node to be in a running state by resuming the passive node from the suspended state, and
configuring the application to be in an online state at the passive node by initiating execution of the application on the passive node; and
updating the configuration information based on the migrating.

2. The method of claim 1, further comprising:
identifying, using a processor, a plurality of virtual machine nodes of the cluster by accessing the configuration information, wherein
the plurality of virtual machine nodes is the plurality of nodes, and
the identifying comprises
identifying the active node, and
identifying the passive node.

3. The method of claim 2, wherein
the plurality of nodes is a plurality of virtual machine nodes,
the configuration information identifies each virtual machine node of the plurality of virtual machine nodes, and
the application is configured to be executed on the active node or the passive node.

4. The method of claim 1, wherein
the active node comprises a first virtual machine,
the passive node comprises a second virtual machine, and
the first virtual machine and the second virtual machine are hosted by the physical computer.

5. A computer readable storage medium comprising program instructions executable to:
access configuration information, wherein
the configuration information indicates
a state of each node of a plurality of nodes of a cluster, and
that an active node and a passive node are associated with an application;

identify, using the configuration information, the passive node of a plurality of passive nodes, wherein
the plurality of nodes comprises the plurality of passive nodes,
each of the plurality of passive nodes is in a suspended state,
the passive node is in a suspended state at least by virtue of
an operating system being loaded on the passive node, and
the application being configured in an offline state on the passive node, and
the passive node is identified by
determining a state of the passive node by
communicating a query, related to the passive node, to a physical computer hosting the passive node, and
receiving a response to the query, wherein
the response comprises information indicating the state of the passive node;
suspend the active node, wherein
the active node is suspended by
stopping the application at the active node by configuring the application to be in an offline state at the active node, and
configuring the active node to be in the suspended state;
migrate the application to the passive node, wherein
the application is migrated to the passive node by
configuring the passive node to be in a running state by resuming the passive node from the suspended state, and
configuring the application to be in an online state at the passive node by initiating execution of the application on the passive node; and
update the configuration information based on the application being migrated to the passive node.

6. The computer readable storage medium of claim 5 further comprising:
identify a plurality of virtual machine nodes of the cluster by accessing the configuration information, wherein
the plurality of virtual machine nodes is the plurality of nodes, and
the plurality of virtual machine nodes are identified by
identifying the active node, and
identifying the passive node.

7. The computer readable storage medium of claim 6, wherein
the plurality of nodes is a plurality of virtual machine nodes,
the configuration information identifies each virtual machine node of the plurality of virtual machine nodes of the cluster, and
the application is configured to be executed on the active node or the passive node.

8. The computer readable storage medium of claim 5, wherein
the active node comprises a first virtual machine,
the passive node comprises a second virtual machine, and
the first virtual machine and the second virtual machine are hosted by the physical computer.

9. A system comprising:
one or more processors; and
a computer-readable storage medium coupled to the one or more processors, wherein the computer-readable storage medium stores program instructions executable by the one or more processors to:

access configuration information, wherein
the configuration information identifies an active node and a passive node, and
the configuration information indicates
a state of each node of a plurality of nodes of a cluster, and
that an active node and a passive node are associated with an application;
identify, using the configuration information, the passive node of a plurality of passive nodes, wherein
the plurality of nodes comprises the plurality of passive nodes,
each of the plurality of passive nodes is in a suspended state,
the passive node is in a suspended state at least by virtue of
an operating system being loaded on the passive node, and
the application being configured in an offline state on the passive node, and
the passive node is identified by
determining a state of the passive node by
communicating a query, related to the passive node, to a physical computer hosting the passive node, and
receiving a response to the query, wherein
the response comprises information indicating the state of the passive node;
suspend the active node, wherein
the active node is suspended by
stopping the application at the active node by configuring the application to be in an offline state at the active node, and
configuring the active node to be in the suspended state;
migrate the application to the passive node, wherein
the application is migrated to the passive node by
configuring the passive node to be in a running state by resuming the passive node from the suspended state, and
configuring the application to be in an online state at the passive node by initiating execution of the application on the passive node; and
update the configuration information based on the application being migrated to the passive node.

10. The system of claim 9, further comprising instructions executable by the one or more processors to:
identify, using the one or more processors, a plurality of virtual machine nodes of the cluster by accessing the configuration information, wherein
the plurality of virtual machine nodes is the plurality of nodes, and
the plurality of virtual machine nodes are identified by
identifying an active node of the cluster, and
identifying a passive node of the cluster.

11. The system of claim 10, wherein
the plurality of nodes is a plurality of virtual machine nodes,
the configuration information identifies each virtual machine node of the plurality of virtual machine nodes of the cluster, and
the application is configured to be executed on the active node or the passive node.

12. The system of claim 9, wherein
the active node comprises a first virtual machine,
the passive node comprises a second virtual machine, and
the first virtual machine and the second virtual machine are hosted by the physical computer.

13. The system of claim 9, further comprising:
a policy master, wherein
the passive node is maintained in the suspended state by continuously monitoring the passive node, and
the policy master comprises the program instructions executable by the one or more processors to access, identify, suspend, continuously monitor, and update.

14. The system of claim 13, wherein
the plurality of nodes are hosted by a plurality of host computers,
the plurality of host computers comprises the physical computer,
the policy master is configured to
communicate with a server that manages the plurality of host computers, and/or
communicate directly with the plurality of host computers by virtue of being configured to utilize a host virtual machine management application programming interface, and
the application is migrated in response to a failure of a resource of the active node.

15. The system of claim 13, wherein
the plurality of nodes are hosted by a plurality of host computers,
the plurality of host computers comprises the physical computer, and
the continuously monitoring comprises
communicating one or more queries to each of the plurality of host computers hosting one or more of the plurality of passive nodes,
determining a state of each of the plurality of passive nodes, and
updating the configuration information based on the determining.

16. The system of claim 13, further comprising:
cluster software, wherein
the cluster software is configured to manage the cluster,
the policy master is configured to communicate with cluster software, and
the cluster software is configured to perform migration of the application, as instructed by the policy master.

17. The method of claim 1, wherein
the updating causes the configuration information to indicate that the state of the active node is suspended and the state of the passive node is running.

18. The method of claim 1, wherein
the plurality of nodes are hosted by a plurality of host computers,
the plurality of host computers comprises the physical computer,
the accessing, the identifying, the suspending, and the updating are performed by a policy master, in response to a failure of a resource of the active node, and
the policy master is configured to
communicate with a server that manages the plurality of host computers, and/or
communicate directly with the plurality of host computers by virtue of being configured to utilize a host virtual machine management application programming interface.

19. The method of claim 1, wherein
the plurality of nodes are hosted by a plurality of host computers,
the plurality of host computers comprises the physical computer, the passive node is maintained in the suspended state by continuously monitoring the passive node, the continuously monitoring is performed by a policy master and comprises communicating one or more queries to each of the plurality of host computers hosting one or more of the plurality of passive nodes, determining a state of each of the plurality of passive nodes, and updating the configuration information based on the determining, and the policy master is configured to communicate with cluster software that is configured to manage the cluster.

20. The method of claim 19, wherein the policy master is configured to communicate with the cluster software, and perform the accessing, the identifying, the suspending, and the updating the configuration information based on the migrating, and the cluster software is configured to perform the migrating, as instructed by the policy master.

* * * * *